UNITED STATES PATENT OFFICE.

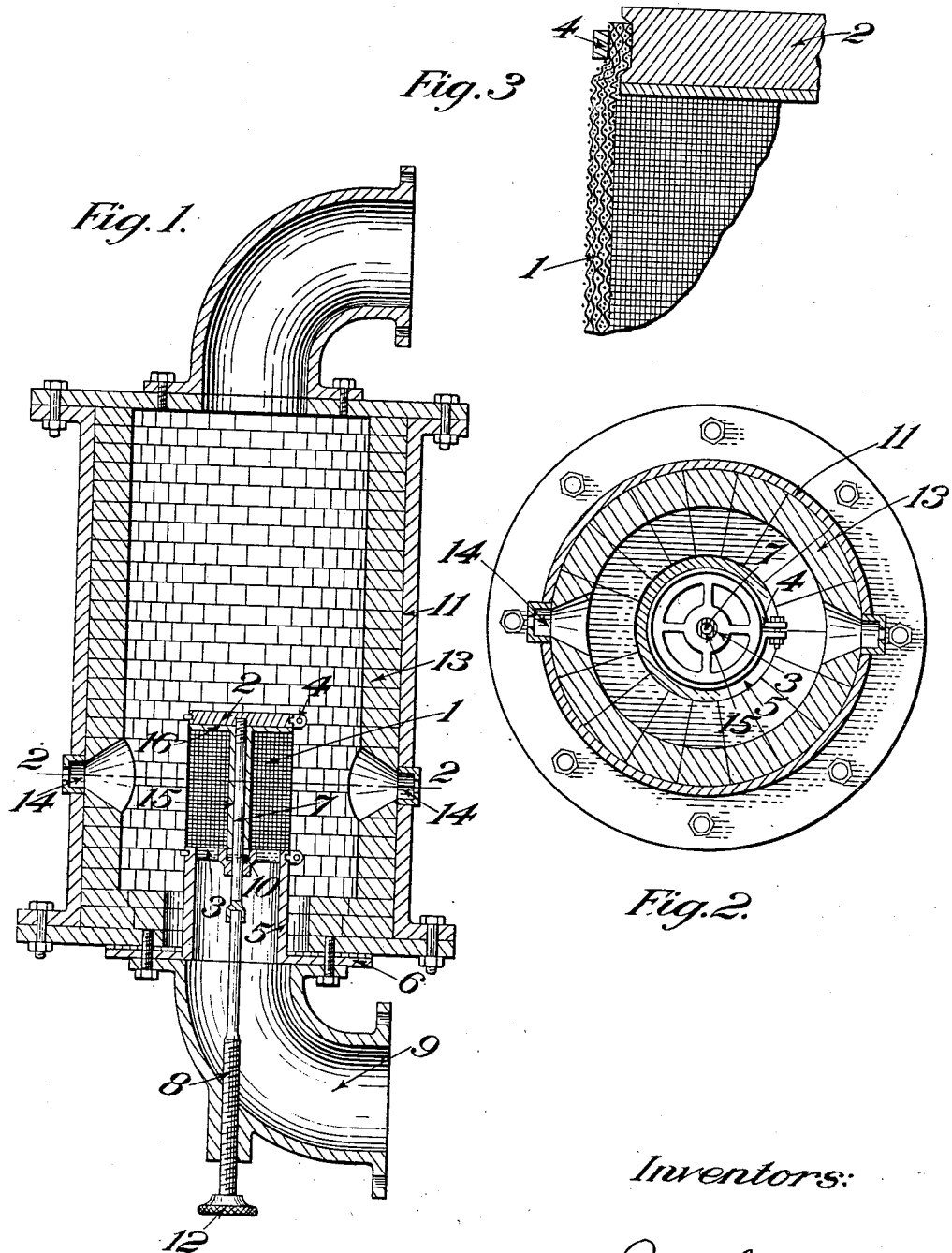

LOUIS C. JONES, OF SYRACUSE, NEW YORK, AND CHARLES L. PARSONS, OF WASHINGTON, DISTRICT OF COLUMBIA.

PROCESS OF OXIDIZING AMMONIA AND APPARATUS THEREFOR.

1,321,376.      Specification of Letters Patent.      Patented Nov. 11, 1919.

Application filed February 19, 1918. Serial No. 218,094.

(FILED UNDER THE ACT OF MARCH 3, 1883, 22 STAT. L., 625.)

*To all whom it may concern:*

Be it known that we, LOUIS C. JONES, a citizen of the United States, and resident of Syracuse, in the county of Onondaga and State of New York, and CHARLES L. PARSONS, a citizen of the United States, and residing in Washington, in the District of Columbia, have invented certain new and useful Improvements in Processes of Oxidizing Ammonia and Apparatus Therefor, of which the following is a specification.

This application is made under the act of March 3, 1883, chapter 143 (22 Stat., 625) and the invention herein described and claimed may be used by the Government of the United States or any of its officers or employees in the prosecution of work for the United States, or by any other person in the United States, without the payment of any royalty thereon.

Our invention relates to processes for oxidizing ammonia to form oxids of nitrogen and nitric acid and includes an improved apparatus for carrying out said processes.

It has long been known that when a mixture of ammonia and air is brought into contact with a suitable contact agent, such as platinum, at a red heat, the ammonia is oxidized forming water, nitrogen, and oxids of nitrogen, the two last named substances being formed in proportions which depend upon the conditions surrounding the reaction. If the mixture of ammonia and air is continuously passed over the contact agent a portion of the ammonia may of course escape oxidation. Many attempts have been made to utilize the oxidation of ammonia for the commercial production of nitric acid, since the oxids of nitrogen produced may be readily converted into that compound, and it will be seen that the success of such processes depends largely upon the proportion of the ammonia which is converted into oxids of nitrogen. To secure a high efficiency of conversion, it is necessary that the contact agent be maintained at a temperature of not less than about 700° C and although the reaction

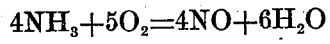
$$4NH_3 + 5O_2 = 4NO + 6H_2O$$

is exothermic, it is not so strongly exothermic as to readily keep the contact body at a suitable temperature. To secure the required temperature of the contact body, several expedients have been proposed such as regenerative heating of the mixture passing to the contact agent by products of the combustion, enrichment of the air of the mixture to give it an abnormally high oxygen content, and heating the contact agent with an electric resistor or otherwise. These methods of operation imperfectly accomplish their object or add to the operating cost and for this reason, none of them have been entirely successful.

The objects of our invention are to provide a process and apparatus by which ammonia can be oxidized with an efficiency approaching 100% and by which the cost of producing oxids of nitrogen is minimized in regard to both the initial cost of the apparatus and the operating expense per unit of nitric acid produced.

More specifically, our object is to incorporate into a process and apparatus for burning ammonia, certain new principles discovered by us in such a manner as to secure a very high efficiency of conversion while avoiding the excessive operating expense incident to various known processes.

We have found that the contact body may be so arranged and disposed that a considerable portion of the heat which would otherwise be dissipated in the reaction products and to the surrounding material may be caused to remain in the contact agent so that the amount of heat liberated in the reaction is entirely adequate to maintain the contact body at the requisite temperature provided certain entirely feasible methods are used to prevent the escape of heat therefrom.

We have discovered that if the contact material is disposed in a thin sheet, for example, as a metallic gauze, and the sheet is arranged so that a large proportion of its surface is opposed to other catalytic surface, the radiation from any given portion of the catalytic sheet will fall upon some other portion of the catalytic surface and be partly absorbed thereby, thus being added to the heat imparted to the service receiving the radiation by the combustion occuring at said radiation-receiving surface. That is, if the catalytic surface is arranged as a tube which may be a cylinder, or in the form of a prism having for example, a square or hexagonal cross-section, every part of the inner surface will be opposed by another portion which will receive the radiation therefrom. We have also discovered that a further amount of heat is returned to the contact body if a sheet of the latter is surrounded by essentially parallel surfaces of material capable of reflecting heat and also adapted to absorb heat and radiate it back upon the catalyst. These principles of construction are embodied in the apparatus shown in the accompanying drawing in which—

Figure 1 is a vertical section of the complete burner.

Fig. 2 is a section on the line 2—2, and

Fig. 3 is an enlarged view of a portion of Fig. 1.

The contact element of the apparatus shown is a cylinder 1 made up of a plurality of layers of fine gauze, constructed of fine wire of suitable material, for example, platinum, platinum-palladium, or better still, platinum gauze which has been "platinized" or coated with platinum black or platinum sponge by depositing upon it more platinum from solution. The cylinder is built up by winding the gauze evenly around the peripheries of the plate 2 and the spider 3 which constitute respectively, the upper and lower heads or ends of the cylinder. After the desired number of layers of gauze have been laid on, the clamping rings 4 are put in place and tightened to conform to the grooves in the members 2 and 3.

The spider 3 forms the integral head of a cylinder 5 which has an outwardly projecting flange 6.

The upper plate 2 is supported on rods 7 and 8, rod 7 being rigidly attached to the plate 2 and rod 8 being provided with a threaded portion passing through a hole tapped in the wall of the inlet conduit 9. The upper end of rod 8 is inserted in a socket in the lower end of rod 7 so that vertical motion may be imparted to rod 7 without rotation of the rod 7, this being prevented by a pin 10 inserted therethrough, which pin lies in a slot provided in the upper surface of the spider 3.

The flange 6 and the inlet pipe 9 are both bolted rigidly to a casing 11, surrounding the contact element. The cylinder of gauze may be stretched taut and smooth by proper rotation of the hand wheel 12 attached to the rod 8.

The casing 11 has a lining 13 of enameled brick or other material which will withstand the action of the oxids of nitrogen at a red heat. The entire structure is bolted together in the manner shown in the drawing, or in any other suitable way. Sight holes 14 are provided for observing the catalyst.

In an efficient converter or burner which has been constructed according to our invention, the gauze is made of wire 0.0025 inch in diameter with 80 meshes to the linear inch, and consists of a band thirteen inches in width wound as a cylinder nine inches in diameter as shown in drawing. The material of the gauze is preferably "platinized" platinum, or a platinum-palladium alloy containing 10% palladium, but pure platinum or any of the alloys which have been proposed as catalysts in this reaction may be used. The gauze is wound until there are four complete layers. We have found it to be essential to the highest efficiency that the different layers conform exactly to each other and contact with those on either side throughout their entire surface. If the layers are separated at any point, less efficient conversion results. For this reason, care must be exercised in winding the gauze and we prefer to stitch the fabric of gauze together with platinum wire, for example, at the four corners of each inch square of surface in order to avoid any possible displacement of the layers.

The spider 3, the parts 5 and 6, and the rod 7, we prefer to construct of nickel. Many metals induce combustion in heated mixtures of ammonia and air but in the case of many of the common metals, the reaction represented by the equation

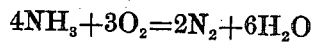
$$4NH_3 + 3O_2 = 2N_2 + 6H_2O$$

is the principal one which takes place. Nickel does not induce this nitrogen forming reaction to any considerable extent and has the further advantages of resistance to the action of the substances present and rigidity at the temperatures employed.

If desired, the rod 7 and plate 2 may be kept out of contact with the mixture by means of the tube 15 and the plate 16 of alundum, silica or the like applied upon their surfaces. When using nickel, we do not find this protection to be necessary but in the case of other metals, it may be desirable.

In a burner such as that described and shown, an extremely efficient oxidation is obtained. A high concentration of ammonia may be used and no additions of oxygen are required. No preheating of the mixture is required even when the weather is cold and the ammonia-air mixture may be introduced into the apparatus at temperatures not materially exceeding 40° C. Water vapor in the mixture passing to the burner does no harm and need not be removed.

It will readily be seen that the principles discovered by us may be applied in various ways to a great variety of apparatus. If desired, the entire burner may be inverted and will give excellent results in the inverted position. We prefer to maintain the catalytic surface in a vertical position since accumulations of dust on it are thereby largely prevented. However, it may be placed in a horizontal or inclined position. The number of layers of gauze may be either greater or less than four and we mention this number merely as an illustration. The composition of the catalyst and the other portions of the burner may be varied so long as materials are used which possess the properties herein indicated to be desirable.

We claim:

1. In an apparatus for oxidizing ammonia, a contact agent in the form of a sheet so arranged as to have opposed heat-emitting surfaces.

2. In an apparatus for oxidizing ammonia, a contact agent in the form of a sheet having opposed heat-emitting surfaces and a heat reflector surrounding the same.

3. In an apparatus for oxidizing ammonia, a contact agent in the form of a sheet comprising a plurality of porous layers, said sheet being arranged so as to have opposed heat-emitting surfaces.

4. In an apparatus for oxidizing ammonia, a contact agent in the form of a sheet comprising a plurality of porous layers, said sheet being arranged so as to have opposed heat-emitting surfaces, and a heat reflector surrounding the same.

5. In an apparatus for oxidizing ammonia, a contact agent in the form of a tube, comprising a plurality of layers of porous catalytic material.

6. In an apparatus for oxidizing ammonia, a contact agent in the form of a tube and a concentric tube of heat-reflecting material surrounding the same.

7. In an apparatus for oxidizing ammonia, a contact agent in the form of a tube having a heat-reflector surrounding the same.

8. In an apparatus for oxidizing ammonia, a contact agent in the form of a porous tube, at least one end of said tube being closed.

9. In an apparatus for oxidizing ammonia, a contact agent in the form of a tube, the axis of which extends in a substantially vertical direction and the walls of which comprise a plurality of layers of catalytic metal gauze.

10. In an apparatus for oxidizing ammonia, a contact agent in the form of a tube comprising a plurality of layers of catalytic material supported on a frame of non-catalytic material.

11. In an apparatus for oxidizing ammonia, a contact agent in the form of a tube and a nickel frame supporting the walls of said tube.

12. In an apparatus for oxidizing ammonia, a contact agent in the form of a flexible tube, and means for applying tension to the walls thereof.

13. In an apparatus for oxidizing ammonia, a contact agent in the form of a cylinder comprising a plurality of layers of catalytic metal gauze.

14. In an apparatus for oxidizing ammonia, a contact agent in the form of a cylinder comprising a plurality of layers of catalytic gauze lying smoothly together throughout.

15. In an apparatus for oxidizing ammonia, a contact agent in the form of a hollow regular geometrical shape, having opposed heat-emitting surfaces and a heat-reflector surrounding the same.

16. In an apparatus for oxidizing ammonia, a casing, a lining of refractory material within said casing, a chamber having walls of porous catalytic material within said casing, said catalytic material being disposed parallel to said lining, a conduit for introducing a gas mixture into said inner chamber and a conduit for removing gases from said casing.

17. The process of producing oxids of nitrogen which comprises passing a mixture of ammonia and air having a temperature less than 40° C. over a catalytic body and heating said catalytic body solely with heat liberated by the combustion of the mixture.

18. The process of producing oxids of nitrogen which comprises passing a mixture of ammonia and air having a temperature less than 40° C. through a sheet of porous catalytic material and heating said catalytic material solely with heat liberated by the combustion of the mixture.

19. The process of producing oxids of nitrogen which comprises passing a mixture of ammonia and air having a temperature less than 40° C. through a catalytic metal gauze and returning to said gauze by reflection enough heat to maintain it at an effective temperature.

20. The process of producing oxids of nitrogen which comprises passing a mixture of ammonia and air having a temperature less than 40° C. through the walls of a tube of catalytic material and reflecting the heat radiated from said walls.

21. The process of maintaining a catalytic material at a high temperature which comprises disposing surfaces so as to collect the heat radiated from the catalyst and reflect it back on said catalyst, and then supplying heat to said catalyst by burning ammonia.

22. The process of maintaining a catalyst at a high temperature which comprises disposing surfaces of the catalyst so that they will receive the heat radiated from other surfaces of said catalyst and then heating the catalyst by burning ammonia.

LOUIS C. JONES.
CHARLES L. PARSONS.